United States Patent
Sfaelos

(10) Patent No.: US 9,127,963 B2
(45) Date of Patent: Sep. 8, 2015

(54) SELECTION OF BELLWETHER SMART GRID METERS

(75) Inventor: Jimmy Sfaelos, Marietta, GA (US)

(73) Assignee: General Electric Company, Schenectady, NY (US)

( * ) Notice: Subject to any disclaimer, the term of this patent is extended or adjusted under 35 U.S.C. 154(b) by 906 days.

(21) Appl. No.: 13/231,825

(22) Filed: Sep. 13, 2011

(65) Prior Publication Data

US 2013/0066570 A1 Mar. 14, 2013

(51) Int. Cl.
*G06F 19/00* (2011.01)
*G06F 17/40* (2006.01)
*G01D 4/00* (2006.01)
*G01D 1/16* (2006.01)
*G06F 17/00* (2006.01)

(52) U.S. Cl.
CPC .................. *G01D 4/002* (2013.01); *G01D 1/16* (2013.01); *G06F 19/00* (2013.01); *G06F 17/40* (2013.01); *G06F 17/60* (2013.01); *Y02B 90/241* (2013.01); *Y04S 20/32* (2013.01)

(58) Field of Classification Search
CPC ............ G01D 1/00; G01D 1/16; G01D 4/00; G01D 4/002; G01D 7/00; G01D 9/00; G01D 21/00; G06F 11/00; G06F 11/30; G06F 11/32; G06F 11/34; G06F 15/00; G06F 15/16; G06F 17/00; G06F 17/10; G06F 17/40; G06F 17/60; G06F 19/00; Y02B 90/00; Y02B 90/20; Y02B 90/24; Y02B 90/241; Y04S 20/00; Y04S 20/30; Y04S 20/32

USPC ............. 73/1.01, 432.1, 865.8, 865.9, 866.3; 324/74, 500; 340/500, 540, 635, 637, 340/653, 679, 870.01, 870.02, 870.07, 340/870.16; 702/1, 57, 60, 61, 62, 127, 702/182, 187, 189; 705/1.1, 7.11, 7.38; 708/100, 105, 200

See application file for complete search history.

(56) References Cited

U.S. PATENT DOCUMENTS

| | | | |
|---|---|---|---|
| 2,883,255 A * | 4/1959 | Anderson | 346/34 |
| 3,321,613 A * | 5/1967 | Searle | 702/182 |
| 7,402,993 B2 | 7/2008 | Morrison | |
| 7,664,618 B2 * | 2/2010 | Cheung et al. | 702/183 |
| 7,693,670 B2 | 4/2010 | Durling et al. | |
| 7,768,424 B2 | 8/2010 | Harvey et al. | |
| 7,880,641 B2 | 2/2011 | Parris et al. | |
| 8,010,640 B2 | 8/2011 | Aune et al. | |
| 8,010,812 B2 | 8/2011 | Forbes, Jr. et al. | |
| 2007/0200553 A1* | 8/2007 | Morrison | 324/142 |
| 2008/0010030 A1* | 1/2008 | Cheung et al. | 702/34 |

* cited by examiner

*Primary Examiner* — Edward Cosimano

(74) *Attorney, Agent, or Firm* — Sutherland Asbill & Brennan LLP

(57) ABSTRACT

A method for selection of bellwether smart meters from a plurality of smart meters in a power grid can include for at least each of a subset of the plurality of smart meters, monitoring a meter; determining at least one anomaly in the meter, in response to a determination of an anomaly in the meter, assigning a weight to the anomaly, determining a sum of weights of anomalies in the meter and selecting a sub group of the plurality of smart meters as bellwether meters.

20 Claims, 5 Drawing Sheets

FIG. 2
Seasonal Coefficients

| Winter = 1 | Spring = 2 | Summer = 4 | Fall = 2 |
|---|---|---|---|

FIG. 3
Type of Service Anomaly Coefficients

| Service Outage = 10 |
|---|
| Half Waving = 9 |
| Power Swell = 8 |
| Power Sag = 7 |

FIG. 4
Most Recent Anomaly Events to Most Distant Anomaly Event Coefficients

| Year 2010 = 10 |
|---|
| Year 2009 = 9 |
| Year 2008 = 8 |
| Year 2007 = 7 |
| Year 2006 = 6 |
| Year 2005 = 5 |

FIG. 5
Coefficients Based on Anomaly Event Duration

| 1 hour events = 1 |
|---|
| 2 hour events = 2 |
| 3 hour events = 3 |
| 4 hour events = 4 |
| 5 hour events = 5 |

FIG. 6

List of Bell Weather Meters and the Calculations/(Coefficients) Used

| Meter 1 | 150 = (10)EventA + (10)EventB + (8)EventC + ..... |
|---|---|
| Meter 2 | 140 = (9)EventA + (10)EventB + (8)EventC + ..... |
| Meter 3 | 150 = (10)EventA + (10)EventB + (8)EventC + ..... |
| Meter 4 | 140 = (9)EventA + (10)EventB + (8)EventC + ..... |
| Meter 5 | |

| Meter 1 | 150 = (10)EventA + (10)EventB + (8)EventC + ..... |
|---|---|
| Meter 2 | 140 = (9)EventA + (10)EventB + (8)EventC + ..... |
| Meter 3 | 130 = (9)EventA + (9)EventB = (8)EventC + |
| Meter 4 | 120 = (8)EventA + (8)EventB + (8)EventC + ..... |
| Meter 5 | 110 = (7)EventA + (6)EventB + (4)EventC + ..... |

ETC.

600

Most Problematic to Least

Different Tables of Calculations, Coefficients or for Different Distributions Drops or Sub Stations

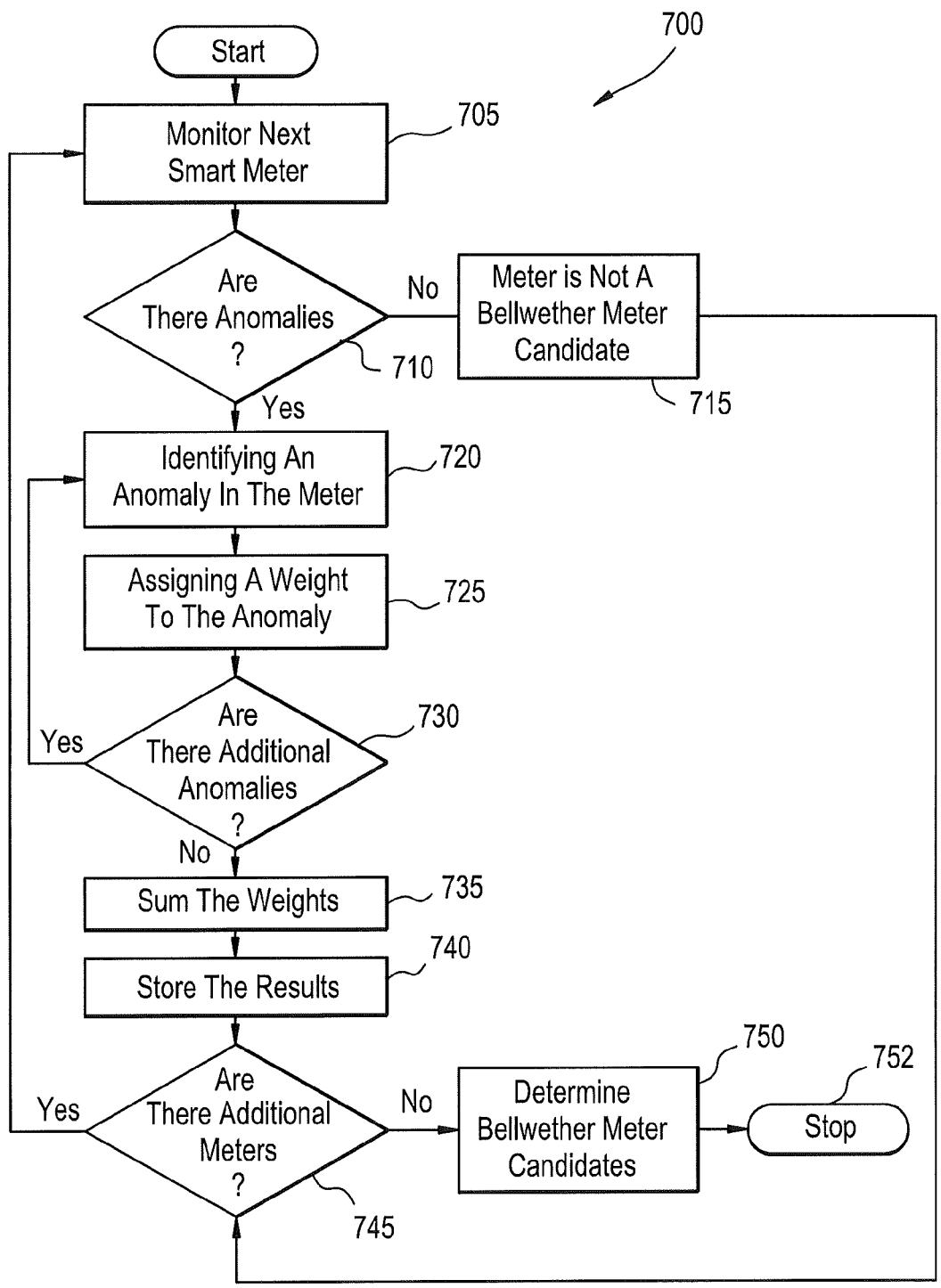

SELECTION OF BELLWETHER SMART GRID METERS

BACKGROUND OF THE INVENTION

The subject matter disclosed herein relates to electrical power distribution systems and more particularly to systems and methods for selecting bell weather smart grid meters.

In an electrical power distribution network, a smart grid delivers electricity from suppliers to consumers using two-way communications to control smart grid appliances at consumers' homes, which allows the utility to control the smart grid appliances (e.g., at peak times) and in return gives the consumer some benefit such as reduced rates. The smart grid is a part of the power distribution network and can include smart meters, which record power consumption at time intervals and communicates the information back to the utility for monitoring and billing purposes. Smart meters enable the two-way communication between the meter and the central system. Smart meters can gather data for remote reporting. The utility selects certain smart meters as representative (or bellwether) meters for areas in the smart grid to pre-determine power distribution behavior in the area (e.g., anticipation of power outages). As such, bellwether meters provide an overall reading of the health of the area in the power grid. Typically, bellwether meters are subjectively and manually selected by humans. As such a list of bellwether smart grid meters are currently selected by hand. The list may need to be changed on a daily/seasonal load profile basis, or as the utility's grid changes over time. The hand-selection process typically occurs at random times of the calendar year, if the utility does indeed update their list of bellwether meters. Therefore, the selection of bellwether meters in this manner can over-emphasize areas that are not problematic and overlook areas that are developing a power distribution problem.

BRIEF DESCRIPTION OF THE INVENTION

According to one aspect of the invention, a method for selection of bellwether smart meters from a plurality of smart meters in a power grid is described. The method can include for at least each of a subset of the plurality of smart meters, monitoring a meter, determining at least one anomaly in the meter, in response to a determination of an anomaly in the meter, assigning a weight to the anomaly, determining a sum of weights of anomalies in the meter and selecting a sub group of the plurality of smart meters as bellwether meters.

According to another aspect of the invention, a computer program product for selection of bellwether smart meters from a plurality of smart meters in a power grid is described. The computer program product can include a non-transitory computer readable medium storing instructions for causing a computer to implement a method. The method can include for at least each of a subset of the plurality of smart meters, monitoring a meter; determining at least one anomaly in the meter, in response to a determination of an anomaly in the meter, assigning a weight to the anomaly, determining a sum of weights of anomalies in the meter and selecting a sub group of the plurality of smart meters as bellwether meters.

According to yet another aspect of the invention, a system for selection of bellwether smart meters from a plurality of smart meters in a power grid is described. The system can include a network management system configured to, for at least each of a subset of the plurality of smart meters, monitor a meter, determine at least one anomaly in the meter, in response to a determination of an anomaly in the meter, assign a weight to the anomaly, determine a sum of weights of anomalies in the meter and select a sub group of the plurality of smart meters as bellwether meters.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 2 illustrates a chart showing seasonal weights that can be associated with anomalies.

FIG. 3 illustrates a chart of different types of specific anomalies that can occur, with associated weights.

FIG. 4 illustrates a chart of weights given to anomalous events as they have historically occurred for particular meters.

FIG. 5 illustrates a chart of weights given to the duration of an event.

FIG. 6 illustrates an example of a chart in which the bellwether meters can be stored.

FIG. 7 illustrates a flow chart of a method for selecting bellwether smart grid meters in accordance with exemplary embodiments.

The detailed description explains embodiments of the invention, together with advantages and features, by way of example with reference to the drawings.

DETAILED DESCRIPTION OF THE INVENTION

Figure 1:
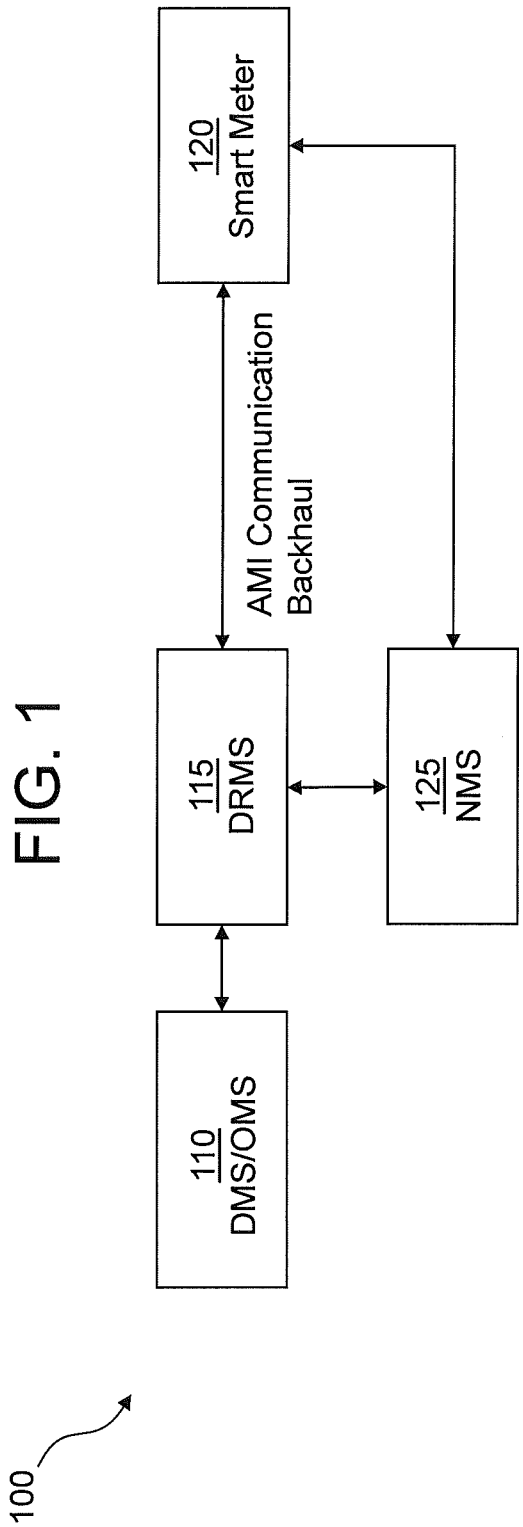
FIG. 1 illustrates an exemplary system for selecting bellwether smart grid meters.

FIG. 1 illustrates an exemplary system 100 for selecting bellwether smart grid meters. It will be appreciated that the system 100 is a part of a larger power distribution network controlled by a power utility. In exemplary embodiments, the system 100 automatically and repeatedly selects smart grid meters in accordance with pre-determined parameters as described herein. Selected bellwether meters can be timed stamp and stored with revisions in a data base. As such, the utility can have an automated selection process that adjusts to load profiles based on time intervals (e.g., daily or seasonal), changes to the utility's grid, problem and non-problem grid locations and the like. In this way, the utility can assign the bellwether meters a high priority into which the utility can tap to make readings in order to check on the overall health of the area that the bellwether meter represents. The utility can therefore tap into a limited number of meters to gain an overall reading of the entire power grid.

In exemplary embodiments, the system 100 can include a distribution management system (DMS) or outage management system (OMS) (collectively DMS/OMS 110). A distribution management system is an electric power utility operational system responsible for collecting data from and controlling all electric power distribution devices (e.g., switches, voltage regulators, and capacitor banks) on the power distribution network. The distribution management system actively manages distribution devices to increase efficiency and reliability in the power distribution network. The distribution management system can also collect and examine data for the purposes of setting rates, making rate adjustments and controlling consumer devices via messages to the consumer devices. An outage management system can predict locations of fuses or breakers that open upon a failure, prioritize restoration efforts and manage resources based upon criteria such as locations of emergency facilities, size of outages, and duration of outages, provide information on the extent of outages and number of customers impacted to management, media and regulators, calculate an estimation of restoration times, manage crews assisting restoration and calculate crews necessary for a restoration. The system can further include a demand response management system (DRMS) 115 that is operatively coupled to the DMS/OMS 110. The DRMS 115 links the electric utility back office to the utility customers in order to reduce the loads during peak energy consumption periods. When the electric utility back office identifies a current peak energy consumption period, DRMS 115 will signal smart grid meters and the consumer devices communicating with the meters to reduce electric power consumption. In exemplary embodiments, demand response events can be controlled by directly controlling end consumer devices (i.e., direct load control), or by sending variable power rates to end consumer devices (i.e., pricing control) to shift consumer electric power consumption behavior. The DRMS 115 is therefore a utility operational system responsible for creating and managing demand response events that control end consumer electric power consumption.

In exemplary embodiments, the DRMS 115 can communicate directly with a customer smart meter 120, which can be via an Automated Metering Infrastructure (AMI) communication backhaul as known in the art. The DRMS 115 can therefore have direct control and access to the smart meter 120. In exemplary embodiments, the smart meter 120 is an electrical meter that records consumption of electric energy in pre-determined time and communicates that information back to the DRMS 115 for monitoring and billing purposes. The smart meter 120 enables two-way communication between the meter and DRMS 115 and gathers data for remote reporting. As described herein, the smart meter 120 can be a bellwether meter that can be tapped by the utility to check on the overall health of the area in which the smart meter 120 resides. The smart meter 120 can include a unique address that is accessible by the DRMS 115, as well as communication protocols that can be updated by the DRMS 115. A single smart meter 120 is illustrated in FIG. 1. It will be appreciated that the single smart meter 120 is illustrated for illustrative purposes. The system 100, which can encompass a small area of the power distribution network, or a larger power grid, can include thousands of smart meters.

In exemplary embodiments, the system 100 can further include a network management system (NMS) 125 operatively coupled to the DRMS 115 and the smart meter 120. The NMS 125 is a system responsible for setting and maintaining the priorities set to the smart grid meters such as the smart meter 120. The priorities set to and measurements made on the smart meter 120 can be performed directly by the NMS 125 via the AMI communication backhaul or through the DRMS 115 via the AMI communication backhaul.

As described herein the smart meter 120 can receive several types of messages from the DRMS 115, providing the smart meter with instructions on how to handle the devices to which the smart meter 120 is attached. In exemplary embodiments, the smart meter 120 can also receive messages from the NMS 125 setting priorities as described herein. The smart meter 120 can also receive messages from the DMS/OMS 110 or the DRMS to take readings from the smart meter 120 for measurement of the health of the smart meter 120. As also described herein, the smart meter 120 can provide messages regarding the power usage of and billing rates associated with the devices to which the smart meter 120 is connected. In exemplary embodiments, as a bellwether meter, the smart meter 120 can also send messages related to the health of the smart meter 120. For example, the smart meter 120 can send a "last gasp message" to the DMS/OMS 110. The "last gasp message" is a message that indicates that the smart meter 120 is about to lose power and go offline. When the smart meter 120 comes back online, the smart meter 120 can provide data to the DMS/OMS 110 related to the power outage, such as indications of "sags" (i.e., drops in overall power), "swells" (i.e., spikes in power) and half waving (i.e., power fluctuations) in the power grid. It will be appreciated that historically "noisy" meters (i.e., ones that go offline relatively often as compared to other meters, or meters that go offline at inconvenient times such as peak times) are practical meters to select as bellwether meters. As such, the DMS/OMS 110 can monitor, control and record meters that comes and goes online and offline due to electric service interruptions. In addition, the NMS 125, with data from the DMS/OMS 110 can ultimately decide and designate a number of meters as bellwether meters. As described herein, the bellwether meters provide continuous and prompt indications of the overall "health" of the utility's grid. By granting the bellwether meters high priority bi-directional communication, the bellwether meters can provide the continuous and prompt health messages. In exemplary embodiment, bellwether meters can be added and removed from the utility's list of bellwether meters based on the historic record of all the meters' onlines/offlines, power swells and sags, and other service impacting anomalies. As such, in exemplary embodiments, the systems and methods described herein automatically select the "noisy" meters as the bellwether meters.

In exemplary embodiments, the system 100 can implement an algorithm that assigns weights to the different anomalies and meters. By weighing the different events that occur, and the times at which the events occur, each meter can be assigned a number. In this way, the weights can assist in automatically differentiating the impact of the different anomalies. The anomalies' length of time, time of day, distribution line/utility grid, and the like, load profile(s) during the anomaly, calendar season, and the like can each be programmed with a scale value to further quantify each anomaly. The system can add up the anomalies for every smart grid meter and formulate lists. Multiple tally lists can be generated for different stretches of calendar time; the entire utility's grid, different distribution lines and substations, etc. In exemplary embodiments, the smart grid meters with the highest, lowest, mid-range or other coefficients can be the candidates for the system 100 to assign them as bellwether meters (e.g., the meters with the highest numbers can be identified as bellwether meters.) In a more specific example, meters that tend to go out during the summer and at peak usage times can be assigned higher weights than meters that tend to go out in the winter at night time. It will be appreciated that over time, the weights can change due to changing conditions in the power grid. For example, buildings can be destroyed and new buildings can be erected. In addition, vegetation can grow and new substations and power lines can be installed. By automatically checking the meters and events, the algorithm can constantly update the list with new bellwether meters, or the removal of meters as bellwether meters. In addition, depending on the events that can occur, the weights assigned to current bellwether meters can be changed. It will be appreciated that over time, a historical record of how the meters have changed, and consequently how the power grids have changes can be recorded and stored. As such, the system 100 can keep a database (associated with the DMS/OMS 110, DRMS 115 or the NMS 125 for example) that can include outage records of all the smart meters, online/offline periods, power swells and sags, and other service impacting anomalies.

FIGS. 2-5 illustrate examples of types and values of weights that can be associated with anomalies as described herein. It will be appreciated that the examples in FIGS. 2-5 are illustrative and not limiting to the types and weights that could be assigned to smart meters in other exemplary embodiments. FIG. 2 illustrates a chart 200 showing seasonal weights that can be associated with anomalies. In the chart, the highest weight is a 4 given for summer time since the summer time is a season in which an outage (i.e., an example of an anomaly) can be problematic. As such, the higher weight, 4, would be assigned to the smart meter (as a bellwether meter) that experienced an outage during the summer FIG. 3 illustrates a chart 300 of different types of specific anomalies that can occur, with associated weights. In this particular example, a full service outage is given the highest weight, as being the most problematic type of anomaly. FIG. 4 illustrates a chart 400 of weights given to anomalous events as they have historically occurred for particular meters. The farther in the past the anomaly, the lower the weight. FIG. 5 illustrates a chart 500 of weights given to the duration of an event. The longer the duration, the higher the weight. As described herein, FIG. 2-5 are only examples illustrating the types of weights that can be assigned in determining bellwether meters from a pool of smart meters in a grid in a power distribution network. The pool of smart meters from which bellwether meters are selected can be in the thousands. As such, the selection of bellwether meters including the assigning and calculation of weights is performed automatically. Once selected, the bellwether meters and their associated weights can be stored in a database as described herein. FIG. 6 illustrates an example of a chart 600 in which the bellwether meters can be stored, identifying a meter identification number, and associated total number based on the assignment of weights. The higher the total number, the most problematic the meter.

FIG. 7 illustrates a flow chart of a method 700 for selecting bellwether smart grid meters in accordance with exemplary embodiments. It will be appreciated that the selection of bellwether meters in continuous and automatic and can therefore occur over extended periods of times including hours, days, weeks and years. As described herein, the method 700 automatically and continuously monitors and selects bellwether meters. At block 705, the system 100 (i.e., via the DRMS 115 or NMS 125) monitors the next meter (e.g., the meter 120) from the pool of meters. As described herein, various messages can also be exchanged between the meters and the DMS/OMS 110, the DRMS 115 and the NMS 125, such as the "last gasp" message described herein. At block 710, the system 100 determines if there are any anomalies associated with the meter. If there are no anomalies associated with the meter at block 710, then at block 715, the meter is determined not to be a candidate for a bellwether meter. From block 715, the method then proceeds to block 745 at which it is determined whether there are additional meters. If there are anomalies associated with the meter at block 710, then at block 720, the system 100 determines the type of anomaly that is detected. At block 725, the system 100 assigns a weight with the anomaly as described with respect to FIGS. 2-5. At block 730 the system 100 determines if there are any additional anomalies associated with the meter. If there are additional anomalies at block 730, then the method 700 continues at block 720. If there are no additional anomalies at block 730, then at block 735, the weights are summed as described herein, and the results are stored at block 740, such as shown in FIG. 6. At block 745, the system 100 then determines if there are additional meters in the pool of meters. If there are additional meters at block 745, then the method 700 continues at block 705. If there are no additional meters at block 745, then at block 750, the system 100 determines which of the meters that included anomalies can be selected as bellwether meters. Once the bellwether meter candidates are selected, then at block 752, the method stops. As described herein, the selection of the bellwether meters can include ranking the meters that have the highest weighted scores as bellwether meters.

As described herein, the DMS/OMS 110, the DRMS 115 and the NMS 125 can all include a computer as well as storage mediums and communications devices. The smart meter 120 can include a processor or computing device as well. An exemplary computing system that can be implemented with any of the DMS/OMS 110, the DRMS 115, the NMS 125 and smart meter 120 is now described.

Figure 8:
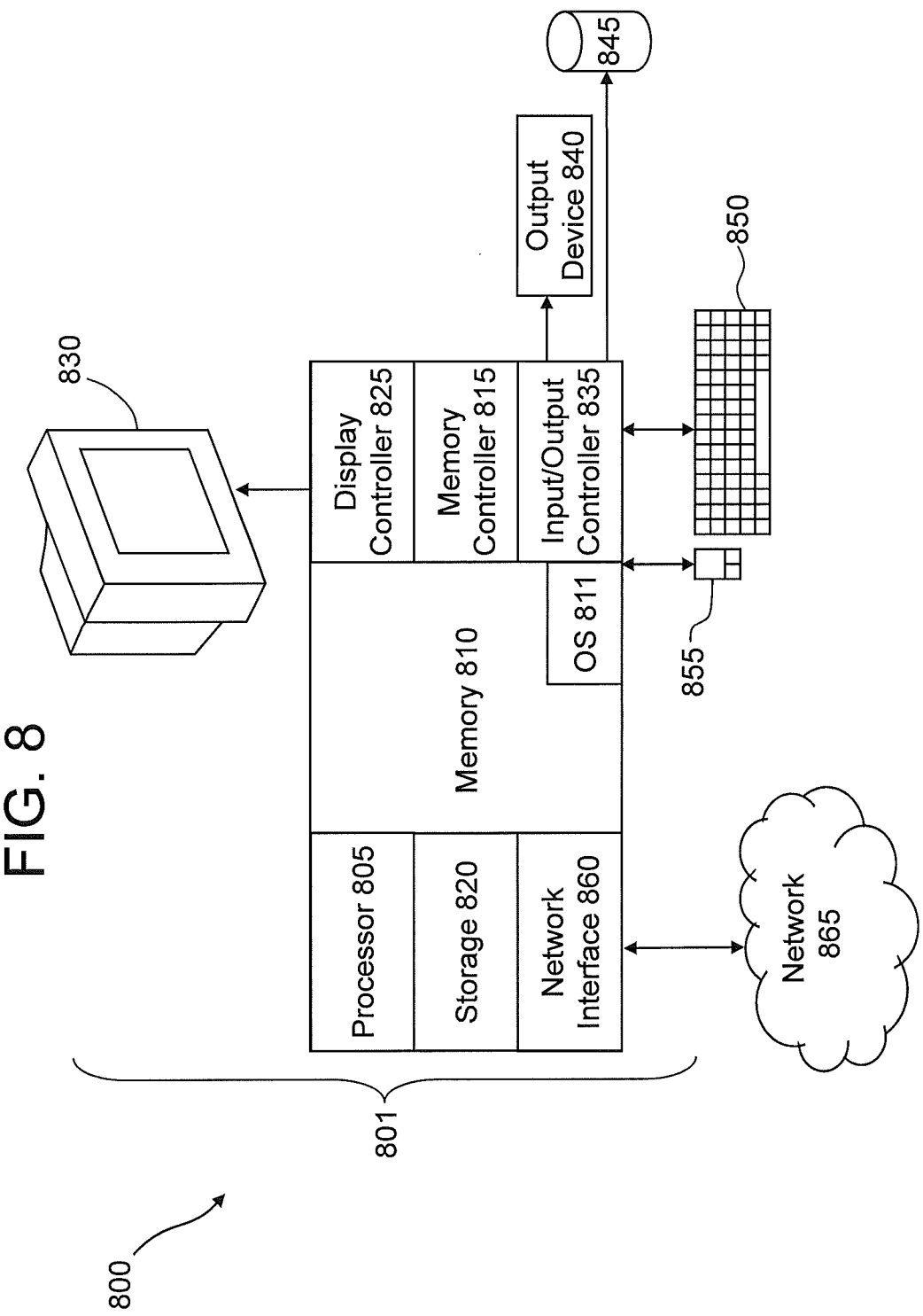
FIG. 8 illustrates an exemplary embodiment of a system for bellwether meter selection.

FIG. 8 illustrates an exemplary embodiment of a system 800 for bellwether meter selection. The methods described herein can be implemented in software (e.g., firmware), hardware, or a combination thereof. In exemplary embodiments, the methods described herein are implemented in software, as an executable program, and is executed by a special or general-purpose digital computer, such as a personal computer, workstation, minicomputer, or mainframe computer. The system 800 therefore includes general-purpose computer 801.

In exemplary embodiments, in terms of hardware architecture, as shown in FIG. 8, the computer 801 includes a processor 805, memory 810 coupled to a memory controller 815, and one or more input and/or output (I/O) devices 840, 845 (or peripherals) that are communicatively coupled via a local input/output controller 835. The input/output controller 835 can be, but is not limited to, one or more buses or other wired or wireless connections, as is known in the art. The input/output controller 835 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 805 is a hardware device for executing software, particularly that stored in memory 810. The processor 805 can be any custom made or commercially available processor, a central processing unit (CPU), an auxiliary processor among several processors associated with the computer 801, a semiconductor based microprocessor (in the form of a microchip or chip set), a macroprocessor, or generally any device for executing software instructions.

The memory 810 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 810 may incorporate electronic, magnetic, optical, and/or other types of storage media. Note that the memory 810 can have a distributed architecture, where various components are situated remote from one another, but can be accessed by the processor 805.

The software in memory 810 may include one or more separate programs, each of which comprises an ordered listing of executable instructions for implementing logical functions. In the example of FIG. 8, the software in the memory 810 includes the bellwether meter selection methods described herein in accordance with exemplary embodiments and a suitable operating system (OS) 811. The OS 811 essentially controls the execution of other computer programs, such the bellwether meter selection systems and methods as described herein, and provides scheduling, input-output control, file and data management, memory management, and communication control and related services.

The bellwether meter selection methods described herein may be in the form of a source program, executable program (object code), script, or any other entity comprising a set of instructions to be performed. When a source program, then the program needs to be translated via a compiler, assembler, interpreter, or the like, which may or may not be included within the memory 810, so as to operate properly in connection with the OS 811. Furthermore, the bellwether meter selection methods can be written as an object oriented programming language, which has classes of data and methods, or a procedure programming language, which has routines, subroutines, and/or functions.

In exemplary embodiments, a conventional keyboard 850 and mouse 855 can be coupled to the input/output controller 835. Other output devices such as the I/O devices 840, 845 may include input devices, for example but not limited to a printer, a scanner, microphone, and the like. Finally, the I/O devices 840, 845 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 800 can further include a display controller 825 coupled to a display 830. In exemplary embodiments, the system 800 can further include a network interface 860 for coupling to a network 865. The network 865 can be an IP-based network for communication between the computer 801 and any external server, client and the like via a broadband connection. The network 865 transmits and receives data between the computer 801 and external systems. In exemplary embodiments, network 865 can be a managed IP network administered by a service provider. The network 865 may be implemented in a wireless fashion, e.g., using wireless protocols and technologies, such as WiFi, WiMax, etc. The network 865 can also be a packet-switched network such as a local area network, wide area network, metropolitan area network, Internet network, or other similar type of network environment. The network 865 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 801 is a PC, workstation, intelligent device or the like, the software in the memory 810 may further include a basic input output system (BIOS) (omitted for simplicity). The BIOS is a set of essential software routines that initialize and test hardware at startup, start the OS 811, and support the transfer of data among the hardware devices. The BIOS is stored in ROM so that the BIOS can be executed when the computer 801 is activated.

When the computer 801 is in operation, the processor 805 is configured to execute software stored within the memory 810, to communicate data to and from the memory 810, and to generally control operations of the computer 801 pursuant to the software. The bellwether meter selection methods described herein and the OS 811, in whole or in part, but typically the latter, are read by the processor 805, perhaps buffered within the processor 805, and then executed.

When the systems and methods described herein are implemented in software, as is shown in FIG. 8, the methods can be stored on any computer readable medium, such as storage 820, for use by or in connection with any computer related system or method.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In exemplary embodiments, where the bellwether meter selection methods are implemented in hardware, the bellwether meter selection methods described herein can implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Technical effects include but are not limited to the ability to automatically select bellwether meters based on an analysis of the power grid's past performance, current performance and seasonal load profiles. As such, bellwether meters can be selected for a particular grid, or Distribution Line(s) or substation(s), or "hot spots" where service anomalies are more frequent than in other areas of the grid.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A method for operating power grid, the method comprising:
   for each of the plurality of smart meters, using a network monitoring system to:
      monitor a smart meter;
      determine at least one anomaly in the smart meter;
      in response to a determination of an anomaly in the smart meter, assign a weight to the anomaly;
      determine a sum of weights of anomalies in the smart meter;
   using the network monitoring system to select a sub group of the plurality of smart meters as bellwether smart meters from smart meters having the sum of weights within a selected range, and
   assign a high priority communication to the bellwether smart meters;
   using a distribution response management system to use the high priority communication to obtain reading from the bellwether smart meters indicative of a health of an area of a power grid represented by the bellwether meters and operate a device of the power grid based on the health in the area of the power grid to increase a reliability of the power grid.

2. The method as claimed in claim 1 further comprising storing the sum of weights for each of the sub group of the plurality of smart meters.

3. The method as claimed in claim 1 further comprising ranking the sub group of the plurality of meters to determine which of the sub group of the plurality of smart meters are the bellwether meters.

4. The method as claimed in claim 1 wherein the weights are determined for at least one of the power grid's past performance, current performance, and seasonal load profiles.

5. The method as claimed in claim 1 wherein the anomalies include at least one of a service outage, half waving, power swell and power sag.

6. The method as claimed in claim 1 further comprising receiving messages from each of the plurality of smart meters.

7. The method as claimed in claim 6 wherein the messages include at least one of a last gasp message and a data related to the anomalies in each of the plurality of smart meters.

8. The method as claimed in claim 1 further comprising generating a historical record of how the plurality of smart meters have changed.

9. The method as claimed in claim 1 further comprising sending messages to the plurality of smart meters.

10. The method as claimed in claim 9 wherein the messages include at least one of checking health of each of the plurality of meters and taking measurements.

11. A computer program product for operating a power grid, the computer program product including a tangible computer readable storage medium storing instructions executable by a computer to cause the computer to implement a method, the method comprising:
   for each of the plurality of smart meters, using a network monitoring system to:
      monitor a smart meter;
      determine at least one anomaly in the smart meter;
      in response to a determination of an anomaly in the smart meter, assign a weight to the anomaly;
      determine a sum of weights of anomalies in the smart meter;
   using the network monitoring system to select a sub group of the plurality of smart meters as bellwether meters from smart meters having the sum of weights within a selected range, and
      assign a high priority communication to the bellwether smart meters; and
   using a distribution response management system to use the high priority communication to obtain reading from the bellwether smart meters indicative of a health of an area of a power grid represented by the bellwether smart meters, and operate a device of the power grid based on the health in the area of the power grid to increase a reliability of the power grid.

12. The computer program product as claimed in claim 11 wherein the method further comprises sending messages to the plurality of smart meters.

13. The computer program product as claimed in claim 12 wherein the messages include at least one of checking health of each of the plurality of meters and taking measurements.

14. The computer program product as claimed in claim 11 wherein the method further comprises receiving messages from each of the plurality of smart meters.

15. The computer program product as claimed in claim 14 wherein the messages include at least one of a last gasp message and a data related to the anomalies in each of the plurality of smart meters.

16. A power grid system, the system comprising:
   a network management system (NMS) configured to:
   for each of the plurality of smart meters:
      monitor a smart meter;
      determine at least one anomaly in the smart meter;
      in response to a determination of an anomaly in the smart meter, assign a weight to the anomaly;
      determine a sum of weights of anomalies in the smart meter;
   select a sub group of the plurality of smart meters as bellwether meters from smart meters having the sum of weights within a selected range; and
   assigning a high priority communication to the bellwether smart meters; and
   a distribution response management system configured to use the high priority communication to obtain reading from the bellwether smart meters indicative of a health of an area of a power grid represented by the bellwether smart meters and operate a device of the power grid based on the health in the area of the power grid to increase a reliability of the power grid.

17. The system as claimed in claim 16 wherein the NMS is further configured to send messages to the plurality of smart meters.

18. The system as claimed in claim 17 wherein the messages include at least one of checking health of each of the plurality of meters and taking measurements.

19. The system as claimed in claim 16 wherein the NMS is further configured to receive messages from each of the plurality of smart meters.

20. The system as claimed in claim 19 wherein the messages include at least one of a last gasp message and a data related to the anomalies in each of the plurality of smart meters.

* * * * *

UNITED STATES PATENT AND TRADEMARK OFFICE
CERTIFICATE OF CORRECTION

PATENT NO. : 9,127,963 B2  
APPLICATION NO. : 13/231825  
DATED : September 8, 2015  
INVENTOR(S) : Sfaelos Page 1 of 1

It is certified that error appears in the above-identified patent and that said Letters Patent is hereby corrected as shown below:

IN THE CLAIMS

In Column 10, Line 23, in Claim 1, delete "operating" and insert -- operating a --, therefor.

In Column 10, Line 38, in Claim 1, delete "meters;" and insert -- meters; and --, therefor.

Signed and Sealed this  
Twenty-ninth Day of March, 2016

Michelle K. Lee  
*Director of the United States Patent and Trademark Office*